UNITED STATES PATENT OFFICE.

EUGEN BAUMANN, OF FREIBURG, GERMANY, ASSIGNOR TO THE FARBEN-FABRIKEN, VORMALS FR. BAYER & CO., OF ELBERFELD, GERMANY.

THYROID EXTRACT AND PROCESS OF MAKING SAME.

SPECIFICATION forming part of Letters Patent No. 626,648, dated June 6, 1899.

Application filed August 5, 1895. Serial No. 558,285. (Specimens.)

*To all whom it may concern:*

Be it known that I, EUGEN BAUMANN, professor of the University of Freiburg, doctor of philosophy, a subject of the Emperor of Germany, residing in the city of Freiburg, in Breisgau, in the Grand Duchy of Baden, Germany, have invented a new and useful Improvement in the Process of Obtaining a new and Valuable Medicinal Product, (for which the Farbenfabriken, vormals Fr. Bayer & Co., have obtained the following patents: German, No. 86,072, dated June 16, 1895; No. 86,876, dated September 3, 1895; No. 87,561, dated October 8, 1895; No. 89,695, dated November 27, 1895; No. 89,696, dated December 5, 1895; No. 89,697, dated January 3, 1896, and No. 91,001, dated January 19, 1896; and English, No. 12,295, dated June 25, 1895; No. 20,827, dated November 4, 1895, and No. 9,576, dated May 5, 1896,) of which the following is a specification.

According to the researches hitherto known the effective substances isolated from the thyroid gland are albumen bodies or enzyms. Thus the thyreo-proteid first prepared and described by Notkin is an albumen body.

The thyroid extracts are in general mixtures which, owing to their varying composition, have but little value in medicine. The new substance prepared by means of my new processes distinctly differs from all the products hitherto prepared from thyroid glands. It is a solid (from yellowish to brownish) uniform substance which does not show albumen reactions and when in a pure state contains 9.3 per cent. of iodine.

The new substance is a product of the splitting up of the complex molecule of the natural iodine-containing body of the thyroid gland which is present, in combination with useless albuminoid matter, and which represents the active properties of the body occurring in nature in a high degree. All thyroid preparations hitherto known, pharmaceutically or otherwise, contain this effective iodine substance either in combination with soluble albuminoid matter or in combination with insoluble albuminoid matter. These thyroid preparations must therefore be split up by means of the gastric juice into the iodine compound and the albuminoid matter before they are ready to exercise any medicinal effect. The new body, however, which is the subject of this specification is assimilated directly and therefore acts in the best and most reliable manner. Again, the new product does not introduce any albuminoid matter into the human system, as do the hitherto-known thyroid preparations. Under certain circumstances the introduction of albuminoids is extremely dangerous, since albuminoids are liable to decomposition with the formation of poisonous alkaloids and like ptomaines.

Although the chemical formula of the new product has not been definitely determined yet, it is a distinct chemical individuum, as shown by the constancy of the amount of iodine present in the pure body. It is distinguished from all thyroid preparations known as "desiccated" thyroids, powdered extracts of thyroid glands, &c., by the following characteristics: First, it contains 9.3 per cent. of iodine; second, it is readily soluble in hot alcohol; third, it is readily soluble in alkali, and, fourth, it contains no albuminoid matter.

The following test distinguishes the new product at once from all hitherto-known thyroid preparations: If one gram of the new product is treated with twenty cubic centimeters of alcohol, the alcoholic solution exhibits a slight coloration and contains the whole amount of iodine present—namely, 0.093 grams of iodine for one-gram preparation—whereas the alcoholic extract from all other thyroid preparations known commercially and medically does not contain a trace of iodine.

In carrying out my invention practically I can proceed as follows, (without limiting myself to the following particulars:)

Example: One part, by weight, of fresh thyroid gland, carefully freed from fatty particles, is boiled with about four parts, by weight, of dilute sulfuric acid (containing ten per cent. of pure sulfuric acid) in a vessel provided with reflux cooler for about twenty to thirty hours. A brownish-yellow liquid results, from which on cooling a flaky brown precipitate separates. The liquid is cooled by means of ice-water and is filtered off after having previously removed the fatty particles which have come to the surface. The residue on the filter which contains the new effective substance of thyroid gland is washed with cold water in order to remove the sulfuric acid and then boiled with alcohol. In this manner the aforesaid precipitate is partly dissolved and a yellowish liquid is obtained, while a black powder remains insoluble. The yellowish filtrate containing the new effective substance dissolved is evaporated to dryness, an indistinct brownish crystalline mass being thus obtained. This substance may be further purified by heating the same with hot ether, by reason of which operation by-products are dissolved, while the effective substance, being insoluble in ether, remains as a yellowish or brownish powder, which is isolated by filtration from by-products.

Another method may also be employed for isolating and purifying the effective substance directly from the alcoholic solution—namely, the aforesaid alcoholic extract can be directly mixed with a sufficient quantity of ether without previously having been evaporated. Owing to the comparative insolubility of the effective substance in ether, the latter will be precipitated likewise as a yellowish or brownish powder, which is filtered off, washed with ether, and dried at ordinary temperature.

Instead of the sulfuric acid other mineral acids or acid agents may be employed.

Since the new body contains iodine in some firm combination, this fact can be practically used in order to determine the end of the reaction in producing the effective substance. In the treatment of the thyroid glands with dilute mineral acids, as described, the end of the reaction can be recognized by ascertaining the amount of iodine contained in the separated precipitate. As soon as this amount is found to be *in maximo* boiling must be discontinued.

The pure substance, obtainable as hereinbefore described, is not albumen or pepton. It forms an amorphous brownish or yellowish powder and is soluble in water with great difficulty, soluble with readiness in alkalies, and possesses slightly acid properties. It readily dissolves in hot alcohol and is nearly insoluble in ether. It contains 9.3 per cent. of iodine.

As to the employment of the aforesaid pure substance in medicine it is advantageous to dilute it with any diluent—as, for example, with milk-sugar, (lactose.) For this purpose one grain of the pure effective substance is mixed with three hundred and nine grains of milk-sugar. Of course these proportional quantities of these two substances may be varied, if desired. The employment of these or the like mixtures is especially indicated in cases of struma, morbus base dovii, or the like diseases. The above-defined milk-sugar compound may be given in daily doses of from one to five grains, according to the severity of the case.

Having now described my invention and in what manner the same is to be performed, what I claim as new, and desire to secure by Letters Patent, is—

1. The process for obtaining a new medicinal compound from the so-called thyroid gland, consisting in acting upon the gland with acid agents, separating the resulting precipitate from the mixture and finally isolating therefrom the effective iodine compound of the thyroid gland in pure state, substantially as described.

2. The specific process for obtaining a new medicinal compound from the so-called thyroid gland, consisting in boiling the gland with dilute sulfuric acid containing ten per cent. of pure sulfuric acid, separating the resulting precipitate from the cooled mixture by filtration, and finally purifying the thus obtained precipitate by means of alcohol and ether, substantially as described.

3. As a new article of manufacture an iodine-containing substance prepared from the thyroid gland, forming a light yellowish brown powder soluble in water with great difficulty, easily soluble in alkali, and readily soluble in hot alcohol, nearly insoluble in ether, containing when in pure state 9.3 per cent. of iodine, being absolutely free from all albuminous matter and characterized from all other hitherto known preparations of the thyroid gland by giving a solution on extraction with alcohol, containing the whole quantity of the iodine substance present, whereas all other thyroid preparations do not impart any iodine compound to the alcoholic solution, in the manner hereinbefore described.

In testimony whereof I have signed my name in the presence of two subscribing witnesses.

EUGEN BAUMANN.

Witnesses:
 EMIL FROMM,
 WILHELM AUTURICK.